2,713,514

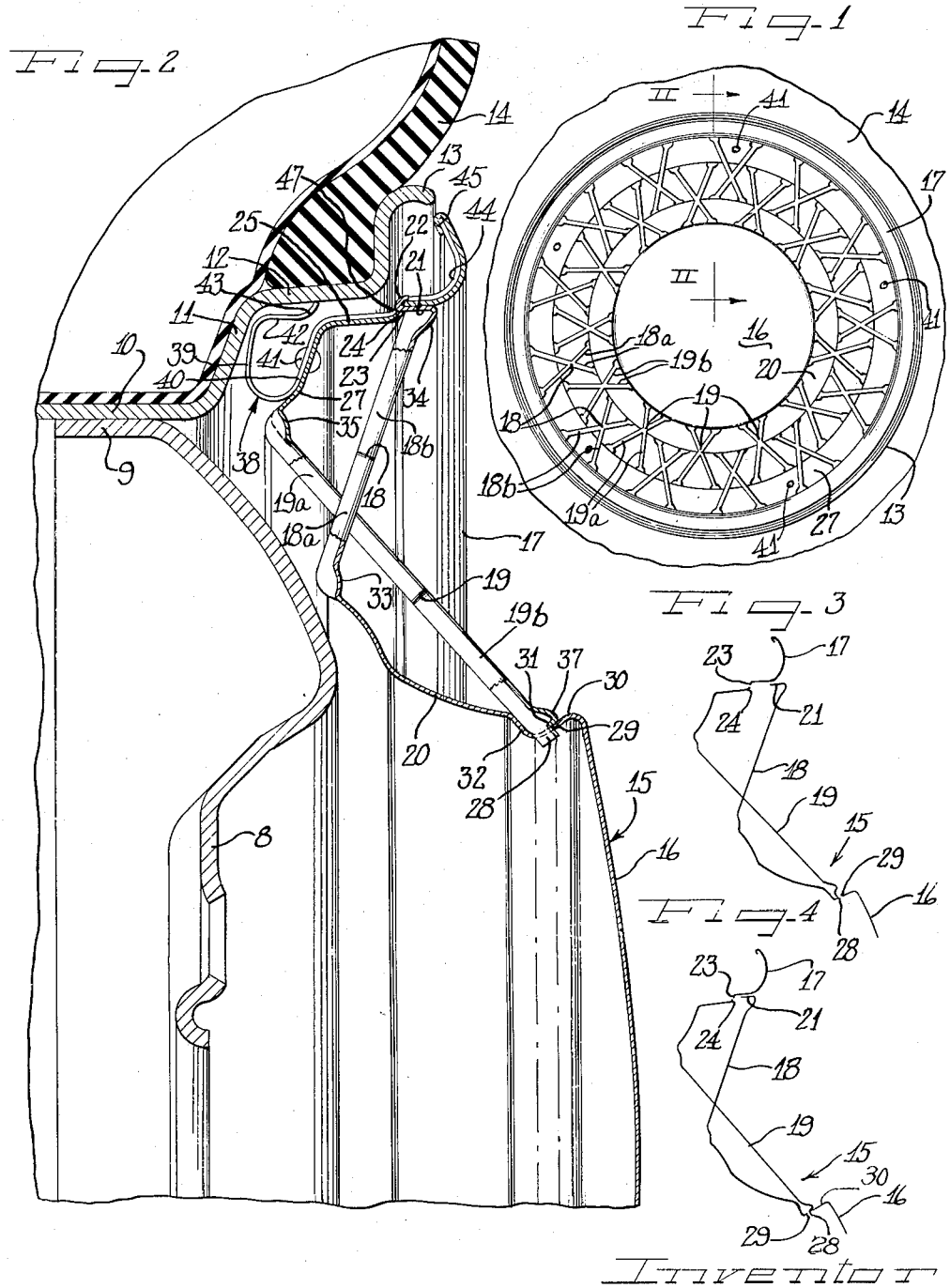
July 19, 1955 — G. A. LYON — 2,713,514
WHEEL COVER
Filed Oct. 4, 1952 — 2 Sheets-Sheet 1
Inventor
George Albert Lyon July 19, 1955  G. A. LYON  2,713,514
WHEEL COVER
Filed Oct. 4, 1952  2 Sheets-Sheet 2
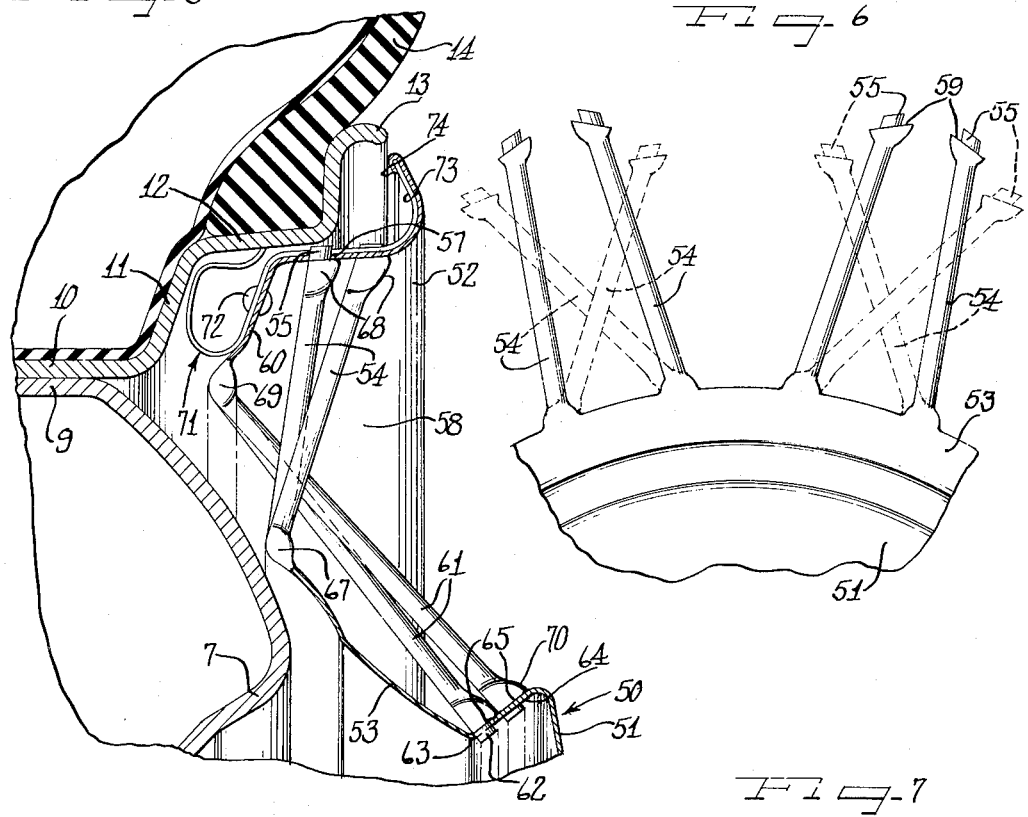
Inventor
George Albert Lyon United States Patent Office 2,713,514
Patented July 19, 1955

WHEEL COVER

George Albert Lyon, Detroit, Mich.

Application October 4, 1952, Serial No. 313,103

6 Claims. (Cl. 301—37)

The present invention relates to improvements in wheel structures and more particularly concerns the ornamental and protective covering of the outer side of vehicle wheels.

An object of the present invention is to provide a vehicle wheel of the conventional disk spider type having novel means thereon to afford the illusion that the wheel is of the wire spoke type.

Another object of the invention is to provide an improved wheel cover having novel means simulating a wire spoke wheel structure.

A further object of the invention is to provide in a wheel cover novel means strongly simulative of the spokes in a wire wheel structure.

Still another object is to provide a novel method of making wheel covers.

Other objects, features and advantages of the present invention will be readily apparent from the following detailed description of a preferred embodiment thereof taken in conjunction with the accompanying drawings, in which:

Figure 1 is a side elevational view of a wheel structure embodying the features of the present invention;

Figure 2 is an enlarged radial sectional view taken substantially on the line II—II of Figure 1;

Figure 3 is a schematic sectional view showing a step in the assembly of the cover components;

Figure 4 is a schematic sectional view showing the cover components in a further stage of assembly;

Figure 5 is a radial sectional view through a wheel structure showing a modified form of the cover;

Figure 6 is a fragmentary outer side elevational view of one of the components of the cover of Figure 5; and Figure 7 is a fragmentary outer side elevational view of a second component of the cover of Figure 5.

As shown on the drawings:

The present invention is especially adapted for use with a wheel of the disk spider type comprising a disk spider wheel body 7 having a central dished bolt-on flange 8 by which the wheel is adapted to be attached to a hub structure of a vehicle axle. At its outer margin the wheel body 7 is provided with a generally axially extending attachment flange which is secured in any suitable manner to a base flange 10 of a tire rim. The tire rim is of the multi-flange, drop center type having extending generally axially and radially outwardly from the outer side of the base flange 10 a side flange 11 which merges with a generally axially outwardly and radially outwardly sloping intermediate flange 12 joining a terminal flange 13. A pneumatic tire and tube assembly 14 is adapted to be supported by the tire rim.

Attached in snap-on, pry-off relation to the outer side of the wheel is a cover which provides not only a decorative and ornamental appearance to the outer side of the wheel but also affords the illusion of the wheel being a wire spoke wheel. To this end the cover 15 comprises a central cover member providing a crown, hub cap simulating portion 16 and an outer trim cover member 17 generally simulative of the outer side of the tire rim and arranged to overlie the tire rim. Joining the inner and outer cover members are respective uniform, complementary series of spoke elements 18 and 19, the spoke elements 18 being carried by the inner cover member and attached at their outer ends to the outer cover member 17, and the spokes 19 being carried by the outer cover member 17 and attached at their inner ends to the inner cover member.

The spokes 18 are preferably attached integrally in one piece with the inner margin of a generally axially inwardly and radially outwardly extending flange on the inner crown member 16 of the cover. Each of the spoke elements 18 comprises a generally X-shaped structure having crossingly related arms formed in one piece with one another and with the inner cover member and providing converging inner terminal portions 18a which are connected to the inner cover flange 20, while corresponding outer terminal portions 18b diverge in line with the converging inner terminal portions 18a. The spoke elements 18 extend generally radially and axially outwardly.

The inner cover member 16 is adapted to be made as a sheet metal stamping, and the spoke members 18 are drawn and stamped to shape. The arms of the spoke members 18 are of hollow outwardly convex cross section which affords the appearance of wire spoke structure and affords substantial rigidity in the spokes. It will be appreciated, of course, that the arms of the spoke members 18 may be formed of fully cylindrical shape or of other geometric cross-section as well as semi-cylindrical if desired.

At their outer extremities, the diverging leg portions 18b have respective generally axially inwardly extending terminal flanges 21 which provide radially outwardly facing abutment shoulders for engagement against a radially inwardly facing portion of the outer annular cover member 17. The flanges 21 have respective extremity portions 22 which project axially inwardly beyond the respective spoke leg portions 18b and through respective receiving slots 23 in a shoulder 24 offset in the member 17 and facing generally axially outwardly. The extremity portions 22 are turned over in the assembly to lock the flanges 21 against withdrawal from the slots 23 and thereby secure the ends of the spokes 18 to the member 17.

The annular outer cover member 17 is preferably drawn from sheet metal with the spokes 19 formed integrally therewith by drawing and stamping operations. The outer portion of the member 17 is preferably of generally rib-like transverse contour for rigidity and is of a diameter to substantially overlie the tire rim terminal flange 13. Extending generally axially inwardly from the shoulder 24 of the member 17 is an annular flange 25 which is of a diameter to lie in assembly with the wheel in inwardly spaced relation from the intermediate flange 12. At its inner margin the flange 25 has a generally radially inwardly and axially inwardly sloping flange portion 27 which is adapted to lie in axially outwardly spaced relation to the side flange 11 of the tire rim. The angular cross-sectional shape of the member 17 affords substantial rigidity.

The spoke members 19 extend integrally in one piece from the inner edge of the flange 27. Each of the spoke members 19 comprises a one-piece generally X-shaped structure extending generally radially inwardly and sloping axially outwardly, and by preference the spoke members 19 are of somewhat greater length than the spoke members 18. Each of the spoke members 19 comprises converging outer legs 19a which are attached to the flange 27, and corresponding aligned diverging inner leg or arm portions 19b.

At their distal ends the spoke arms 19b have respective terminal lugs 28 of preferably circular and in the present instance semi-circular cross-section which are adapted to be engaged in respective complementary apertures 29 in a generally radially outwardly and axially inwardly facing undercut shoulder 30 adjacent to the extremity of the crown portion of the cover member 16. A shoulder 31 facing generally radially inwardly and axially outwardly and inset from the tips of the terminal lugs 28 on the spoke arms 19b abuts the shoulder 30. At the axially inner side of the undercut shoulder 30 is a generally axially outwardly and radially outwardly facing shoulder 32 opposing the adjacent end portions of the spoke arms 19b. It will thus be observed that the ends of the spoke arms 19b are disposed in an annular radially outwardly opening recess or groove in the axially outer part of the side wall or flange 20 of the inner crown member 16.

In order to afford the appearance of attachment hubs at the respective ends of the arms of the spoke members 18, the inner end portions of the arm sections 18a, where they join the inner cover member flange 20 may be provided with outwardly bulging respective embossments 33 while the outer end portions of the arms 18b adjacent to the terminal flanges 21 may be provided with similar embossments 34. For similar reasons the spokes 19 may be provided at the inner ends of the leg portions 19a where they join the flange 27, with outwardly directed embossments 35 while the extremity portions of the spoke arms 19b adjacent to the lugs 28 may be provided with respective outwardly bulging embossments 37.

In the cover assembly, the respective spokes 18 and 19 alternate in crossing relation as depicted in Figures 1 and 2. It will be observed that the inner ends of the spokes 18 are disposed axially inwardly from the spokes 19 and generally intermediately the ends of the spokes 19 as viewed from the outside of the cover. On the other hand, the outer ends of the spokes 19 where they join the flange 27 of the member 17 are disposed substantially axially inwardly from the spokes 18 and are disposed intermediate the ends of the spokes 18.

In assembling the inner and outer cover components 16 and 17, the spoke elements 18 and 19, respectively, thereof are initially preferably angled axially outwardly slightly more than in the final assembly as depicted in Figure 3. The spoke elements 18 and 19 are then initially respectively alternated in generally the location desired therefor in the final cover assembly and the terminal ends 28 of the spoke legs 19b are brought into registration with the respective apertures 29 in the shoulder 30 by stressing the spoke elements 19 generally axially inwardly toward the shoulder 32. This tensions the spoke members 19 and causes the terminal lugs 28 to interengage within the apertures 29 and drives the shoulder 31 of each of the spoke arms under tensioned abutting thrust against the shoulder 30. This is effected by bringing the cover members 16 and 17 into closer relationship by generally respective axial movement of the cover members. During this the outer end portions of the spoke members 18 are brought adjacent to the opposing portion of the cover member 17 and with the ends of the terminal flanges 21 adjacent to the shoulder 24. As the final step in assembling the cover, the spokes 18 are stressed axially inwardly to interengage the flanges 21 in the slots 23 provided therefor and the terminal extremities 22 are bent over to retain the spokes assembled with the member 17. At this time, also, the thrust shoulders provided by the flanges 21 are brought into tensioned thrusting abutment with the opposing flange portion of the member 17. As a result, the cover assembly affords a rigid, rattle-free construction of high serviceability.

Attachment of the cover 15 to the wheel is accomplished in the present instance by means of a series of spring clips 38 carried by the inner side of the outer cover member 17. The clips may be provided in uniformly spaced series, and in any preferred number suitable for the particular size of the cover to which applied. Each of the clips 38 comprises a loop portion 39 having a leg 40 attached as by means of a rivet 41 to the inner side of the cover member flange 27. The spring loop 39 is disposed to extend generally axially inwardly and then radially outwardly behind the cover flange 27 and has a retaining terminal leg 42 which extends generally axially outwardly and has a generally radially outwardly short and relatively stiff terminal extremity flange 43 which engages edgewise in retaining biting relation against the inner surface of the intermediate flange 12 of the tire rim. The construction and relationship of the spring loops 39 is such that the resilient terminal legs 42 of the clips extend to a substantially greater diameter in unstressed condition than the inner diameter of the intermediate flange 12 so that in applying the cover to the wheel, the legs 24 and the spring loops 39 will be placed under resilient tensioned stress as the clip terminals 42 cam inwardly along the terminal flange by application of axially inward pressure against the cover during the application of the cover to the wheel. In the final assembled relationship of the cover with the wheel, the springs 38 support the cover in completely spaced, substantially floating relation to the wheel, enabling the cover to resist resiliently both radial and axial pressures thereagainst. Furthermore, the clips 38 center the cover on the wheel.

The clips 38 are preferably provided with integral extension portions 44 which are preferably generally complementary to the contour of the inner side of the member 17 and have the extremities thereof secured in place by an underturned clamping and reinforcing outer marginal flange 45 on the cover member 17. Intermediately the extension leg portions 44 of the clips conform to the shoulder 24 of the cover member 17 and thereby provide respective reinforcing shoulders 47 at the inner side of the shoulder 24. As a result, the cover member is substantially reinforced against dry-off damage. To remove the cover, a pry-off tool is applied behind the cover member 17 in line with one of the clips 38 as can be readily seen by reason of the head of the rivet 41 showing at the outer side of the cover flange 27. Preliminary pry-off force can be applied against the reinforced margin 45 of the cover member 17 and then the tip of the pry-off tool can be engaged against the clip extension shoulder 47 as a secondary pry-off shoulder to complete pry-off of the cover. The cover member 17 is thereby protected against damage that might result from the tip of the pry-off tool digging into the back of the cover member during pry-off. The material of the spring clips 38 is, of course, spring steel and this is substantially harder than the material from which the cover member 17 may be made. Therefore, the spring clip extension legs 44 will withstand pry-off tool force quite effectively.

In the modification of Figures 5, 6 and 7, the wheel may be identical with the wheel depicted in Figures 1 and 2 and therefore identical reference numerals are applied to indicate the same parts of the wheel. Applied to the outer side of the wheel to afford simultation of a wire spoke wheel is a cover 50 which in general respects is similar to the cover 15 but differs therefrom in the specific construction of the connecting spokes between an inner cover member 51 and an outer cover member 52. To this end, the inner cover member 51 has a generally axially inwardly and radially outwardly extending flange 53 from which extends a series of pairs of spoke elements 54 which are formed initially as substantially radially extending integral spoke extensions at the outer edge of the flange 53, substantially as seen in full outline in Figure 6. The spoke elements 54 are then bent toward one another into crossing relation substantially as depicted in dash outline in Figure 6. Thereby an X-shaped spoke arrangement is provided.

The spokes 54 extend in generally radially outward angular direction and have end terminal lugs 55 assembled in tensioned interlocking relation within respective apertures 57 in a generally axially extending flange portion 58 of the outer annular cover member 52. Offset inwardly from the tips of the lugs 55 are respective thrust shoulders 59 which abut the flange 58 under tensioned thrusting engagement.

The cover member 58 has projecting generally radially inwardly and sloping axially inwardly from the inner margin of the flange 58 a flange portion 60 from the inner edge of which project respective spokes 61. These spokes are initially formed in the drawing and stamping of the cover member 52 as generally radially inwardly extending spoke projections as depicted in full outline in Figure 7, and they are then bent into crossing relation by pairs as seen in dash outline. The spoke members 61 extend generally radially inwardly and axially outwardly and have terminal lugs 62 thereon which engage within respective complementary apertures 63 provided in a generally radially outwardly and axially inwardly facing undercut flange 64 at the axially outer portion of the inner cover member side flange 53. Thrust shoulders 65 on the terminal portions of the spokes 61 inset from the tips of the terminal lugs 62 thrust into tensioned abutment with the flange 64.

The general disposition of the sets of spokes 54 and 61 is much the same as the respective spokes 18 and 19 of the cover 15. That is, the crossing spokes 54 alternate with pairs of crossing spokes 61 in generally crossing relation as visualized in Figure 5, and with the inner ends of the spokes 54 disposed axially inwardly from and intermediate the ends of the spokes 61, while the outer ends of the spokes 61 are disposed axially inwardly from the spokes 54 and intermediate the ends of such spokes.

To afford the illusion of attachment bosses, the inner ends of the spokes 54 are provided with enlargement embossments 67 while the outer end portions adjacent to the shoulders 59 are provided with enlargement embossments 68. Similarly, the spokes 61 at the juncture with the flange 60 are provided with enlargement embossments 69 while adjacent to their inner extremities they are provided with enlargement embossments 70.

For attaching the cover 50 to the wheel in snap-on pry-off relation, retaining spring clips 71 are provided which in essential respects are the same as the clips 38 hereinbefore described and are attached to the flange 60 of the cover by means of rivets 72. Extension legs 73 on the clips are engaged against the inner side of the member 52 and have extremity portions engaged by an underturned marginal reinforcing and clamping flange 74 on the cover member 72. The clips 71 support the cover 50 in self-centered, substantially floating relation on the wheel.

The clip extension portions 73 provide pry-off tool reinforcement at the back of the cover member 52.

Reference is made to my co-pending application Serial No. 323,628 filed December 2, 1952, covering novel features of the retaining spring clips disclosed but not claimed herein.

I claim as my invention:

1. In a disk spider wheel including a disk spider body and a tire rim carried by said body, a cover for the outer side of the wheel affording simulation of a wire spoke wheel, said cover comprising a central cover portion for overlying the wheel body and an outer annular cover portion overlying the tire rim, said inner cover portion having a peripheral flange with a plurality of generally radially and axially outwardly extending generally X-shaped spoke structures with their distal end portions connected to said outer cover portion, said outer cover portion having an inner flange with a plurality of generally X-shaped spoke structures projecting generally radially inwardly and axially outwardly and alternating with the spoke structures of said inner cover portion and having their end portions connected to said inner cover portion, the proximal ends of the outer cover portion spoke structures being disposed substantially radially inwardly and axially inwardly relative to the distal end portions of the spoke structures carried by the inner cover portion.

2. In a disk spider wheel including a disk spider body and a tire rim carried by said body, a cover for the outer side of the wheel affording simulation of a wire spoke wheel, said cover comprising a central cover portion for overlying the wheel body and an outer annular cover portion overlying the tire rim, said inner cover portion having a peripheral flange with a plurality of generally radially and axially outwardly extending generally X-shaped spoke structures with their distal end portions connected to said outer cover portion, said outer cover portion having an inner flange with a plurality of generally X-shaped spoke structures projecting generally radially inwardly and axially outwardly and alternating with the spoke structures of said inner cover portion and having their end portions connected to said inner cover portion, the proximal ends of the spoke structures carried by the inner cover portion being disposed axially inwardly and radially outwardly relative to the distal end portions of the spoke structures carried by said outer cover member.

3. In a cover for disposition at the outer side of a vehicle wheel, a central cover portion, an annular outer cover portion radially spaced from said inner cover portion, said inner cover portion having an undercut generally radially outwardly and axially inwardly facing flange portion and a ledge facing generally axially outwardly at the inner side of said flange portion, and a series of spokes carried by said outer cover portion and having distal end portions attached to said undercut flange portion and resting on said ledge.

4. In a cover for disposition at the outer side of a vehicle wheel, a central cover portion, an annular outer cover portion radially spaced from said inner cover portion, said inner cover portion having an undercut generally radially outwardly and axially inwardly facing flange portion, and a series of spokes carried by said outer cover portion and having distal end portions attached to said undercut flange portion, said undercut flange portion having a series of apertures therein and said distal end portions of the spokes having integral locating shoulders engaging said flange portion and projecting from said shoulders lugs secured in said apertures.

5. In a cover for disposition at the outer side of a vehicle wheel, a central crown portion having a side wall flange extending generally axially inwardly and having a series of spoke elements extending outwardly therefrom, an annular outer cover member encircling said crown cover portion in radially spaced relation and having a series of spoke members projecting therefrom, the spoke elements of said crown cover member being attached to said annular cover member and the spokes of said annular cover member extending toward said crown cover member, said side wall flange having an annular groove therein and the ends of said spoke members of the annular cover member being secured in said groove, said spoke members having respective bulging end portions exposed adjacent said groove and simulating attachment hubs.

6. In a cover for disposition at the outer side of a vehicle wheel, an outer circular cover portion adapted to overlie a tire rim and having a part thereof offset axially and radially inwardly, said part having on the inner side thereof a series of individual resilient strip retaining clips for engagement with the tire rim, said clips being secured to said portion by means of rivets having heads exposed at the outer side of said portion, said clips having portions thereof engageable by a pry-off tool and said rivet heads affording visual indexing for placement of the pry-off tool from the outer side of the cover.

References Cited in the file of this patent

UNITED STATES PATENTS

| | | |
|---|---|---|
| D. 166,863 | McLeod | May 27, 1952 |
| 2,351,655 | Aske | June 20, 1944 |
| 2,404,389 | Lyon II | July 23, 1946 |
| 2,404,390 | Lyon III | July 23, 1946 |
| 2,544,705 | Lyon I | Mar 13, 1951 |

FOREIGN PATENTS

| | | |
|---|---|---|
| 714,587 | France | Sept. 7, 1931 |